Oct. 7, 1958 — H. J. BATES — 2,854,940
DIAPHRAGM PRESS

Filed Aug. 16, 1955 — 5 Sheets-Sheet 1

INVENTOR.
HOMER J. BATES
BY Woodling & Krost
Atty's.

Oct. 7, 1958     H. J. BATES     2,854,940
DIAPHRAGM PRESS
Filed Aug. 16, 1955     5 Sheets-Sheet 2
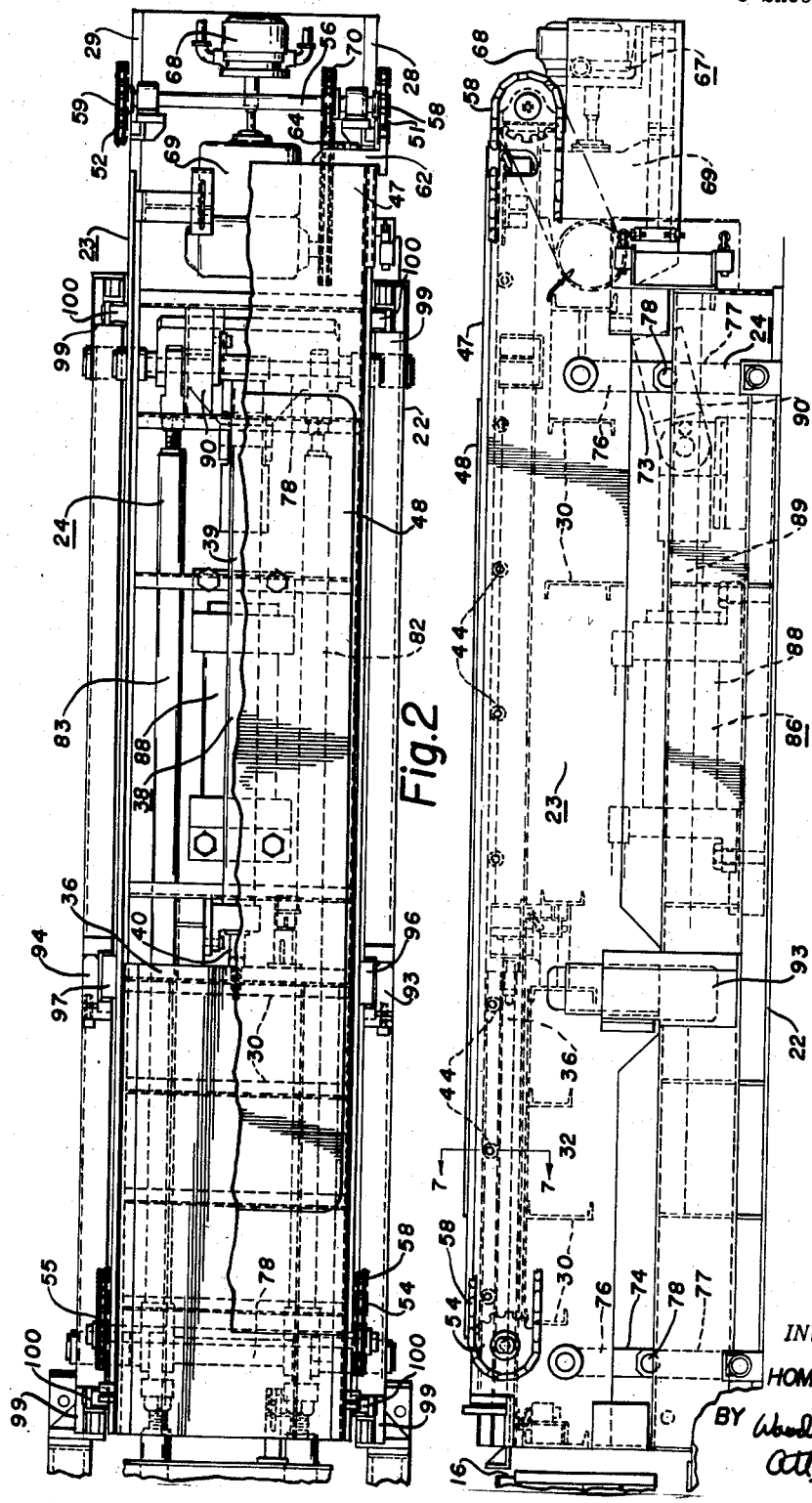
INVENTOR.
HOMER J. BATES
BY Woodling & Krost
Atty's.

Oct. 7, 1958

H. J. BATES 2,854,940

DIAPHRAGM PRESS

Filed Aug. 16, 1955

INVENTOR.
HOMER J. BATES
BY
Woodling & Krost
Atty's.

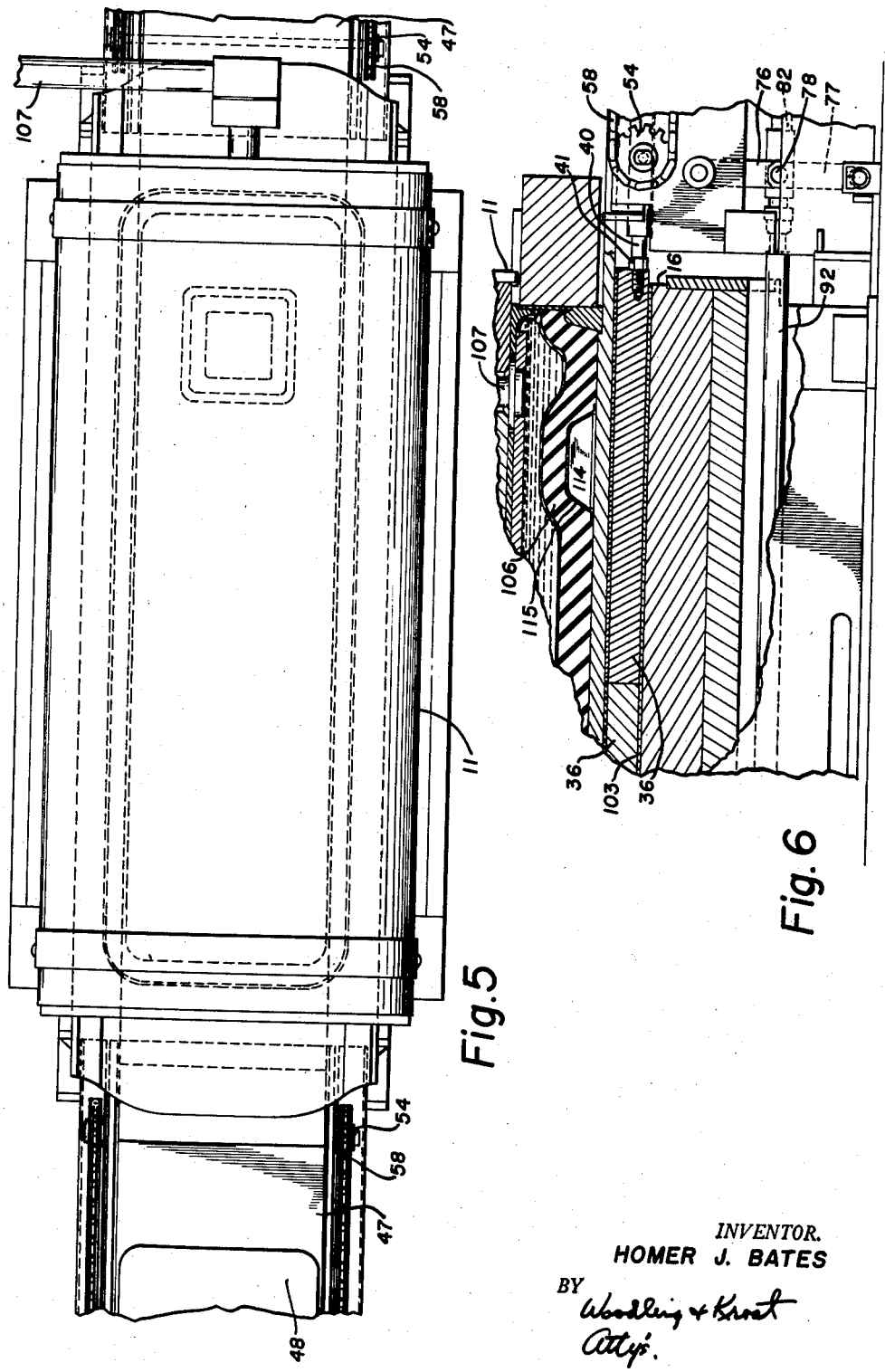

Oct. 7, 1958 H. J. BATES 2,854,940
DIAPHRAGM PRESS
Filed Aug. 16, 1955 5 Sheets-Sheet 5

INVENTOR.
HOMER J. BATES
BY Woodling & Krost
Attys.

United States Patent Office 2,854,940
Patented Oct. 7, 1958

2,854,940

DIAPHRAGM PRESS

Homer J. Bates, Mount Gilead, Ohio, assignor, by mesne assignments, to Koehring Company, Milwaukee, Wis., a corporation of Wisconsin Application August 16, 1955, Serial No. 528,719

7 Claims. (Cl. 113—44)

The invention relates in general to a diaphragm press having a worktable which is movable between a loading position outside of the press and a work position within the press and relates more particularly to means for moving the worktable into the press at a bed level and then raising the worktable to the work position in a generally vertically direction.

In the conventional type of diaphragm press a worktable travels from a loading position outside the press in a single plane and a single direction to a work position within the press which is directly beneath a deformable rubber pad. The rubber pad is forced around work blanks located on form blocks carried by the worktable, during a forming or work opertaion. The ideal condition is to have the form blocks and work blanks located as close as possible to the rubber pad so that an undue amount of stretching or deformation of the rubber pad will not be necessary in order for the pad to reach the work blanks during the forming operation. If the pad must stretch too far its useful life will be greatly reduced. The rubber pad used in this type of press also develops a certain amount of sag or permanent deformation during its life. In the conventional press all of these factors must be considered in determining the clearance between the worktable and the rubber pad. As a result, if the clearance is made too great the life of the rubber pad will be cut down and if it is made too small the rubber pad will misplace the articles which are carried on the worktable while the worktable is traveling to and from the work position. In visualizing the problems which arise in this respect, it will be readily apparent that if these articles become misplaced during or after the forming operation, it would be reltaively impossible to remove the worktable from the press body. This usually results in the partial dismantling of the press body plus a concentrated and determined effort to free the obstruction before these misplaced articles can be re-arranged and the worktable removed from the press.

An object of this invention is therefore to provide a press wherein these problems may be obviated.

Another object of the invention is to provide a diaphragm type press having a worktable which is movable between a loading position and a work forming position with means for moving the worktable vertically into the work forming position.

Another object of the invention is to provide in a diaphragm press which performs a work forming operation by deforming a rubber pad around work blanks which reside on form blocks, with a worktable for carrying the form blocks which worktable enters the diaphragm press in a generally horizontal direction from a loading position outside the press and is then raised to a work forming position beneath the rubber pad.

Another object of the invention is to provide a diaphragm press with a plurality of worktables whereby at least one worktable will be outside of the press so that hand work may be performed thereon while another worktable is within the press during a work forming operation.

Another object of the invention is to provide a press wherein a worktable is movable from a position outside of the press to a work forming position in a first plane within the press whereby said worktable enters said press in a plane other than the first plane in which it resides in the work forming position.

Another object of the invention is to provide a diaphragm press which is durable and sturdy in operation and extremely efficient in operation.

Another object of the invention is the provision of vertically raising a worktable generally vertically to a work forming position adjacent a deformable rubber pad and inserting filler block means for fixedly supporting the worktable in the work forming position.

Another object of the invention is the provision of a diaphragm press wherein a worktable for carrying work blanks and form blocks and a deformable rubber pad for performing the work are movable relative to each other in a generally vertical direction.

Another object of the invention is to provide a right and left platform assembly on either end of a press which platform assemblies have filler blocks therein which are engageable with a worktable which has either end extending from the press and residing above the respective filler blocks whereby upon vertical movement of the platform assemblies the worktable will be caused to be lifted vertically and upon reaching the limit of the vertical movement the filler blocks will be in position to be moved into the press to provide support for the worktable during a work forming operation.

Another object of the invention is to provide a diaphragm press having a deformable pad with means for moving a worktable which carries work blanks and form blocks between a loading position and a work position, without the possibility of the worktable becoming stuck because of the misplacement of the form blocks or because of the possible fracturing of the deformable pad.

Another object of the invention is to provide a diaphragm press which has a movable worktable which has little if any possibility of sticking or becoming obstructed in its movement because of the misplacement of articles carried on the surface thereof.

Other objects and a fuller understanding of the invention may be had by referring to the following description and claims taken in combination with accompanying drawings in which:

Figure 2 is a plan view partially broken away of the right wing shown in Figure 1;

Figure 3 is a side elevational view of the right wing of Figure 1;

Figure 5 is a plan view of the press body shown in Figure 4;

Figure 6 is a fragmentary view of Figure 4 showing the various parts of the press body during the work forming operation;

Figure 1:
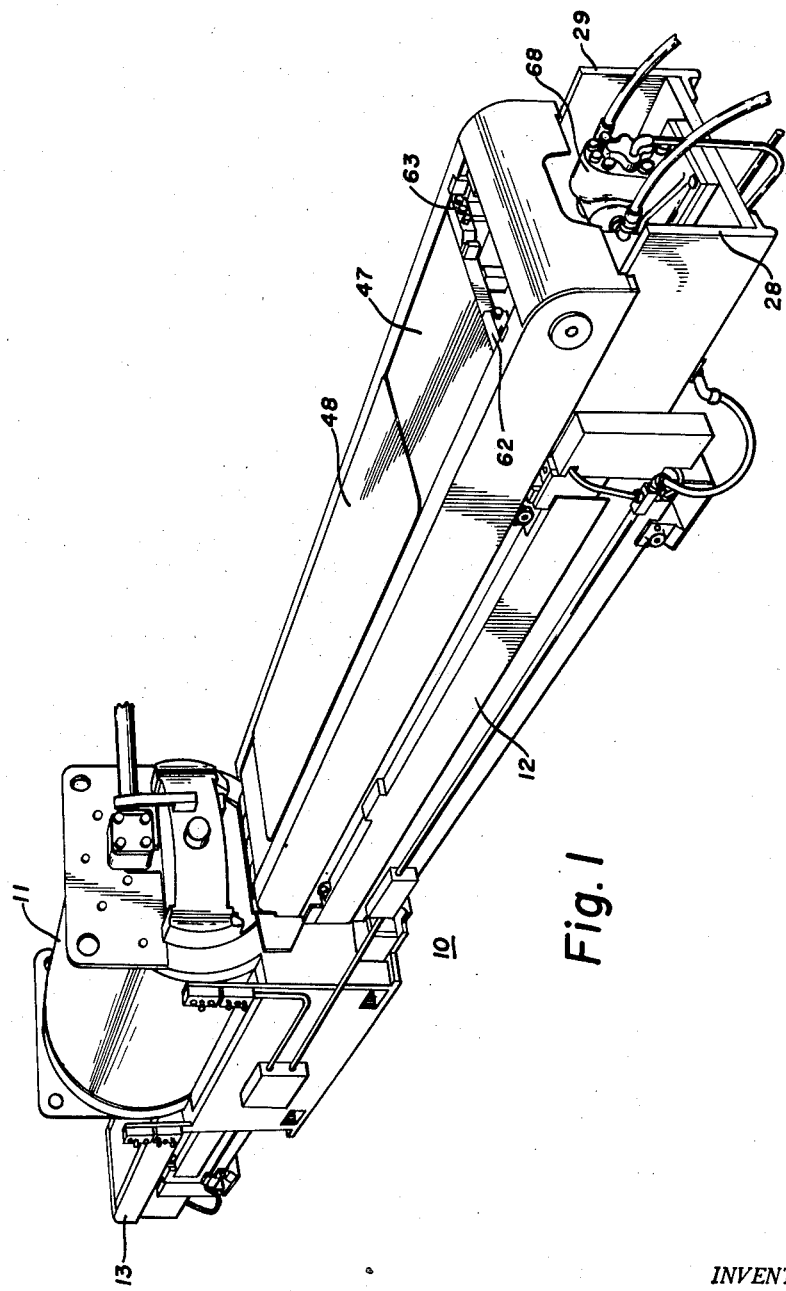
Figure 1 is a perspective view of the diaphragm press assembly of this invention showing a press body and a right and a left wing.
Figure 4:
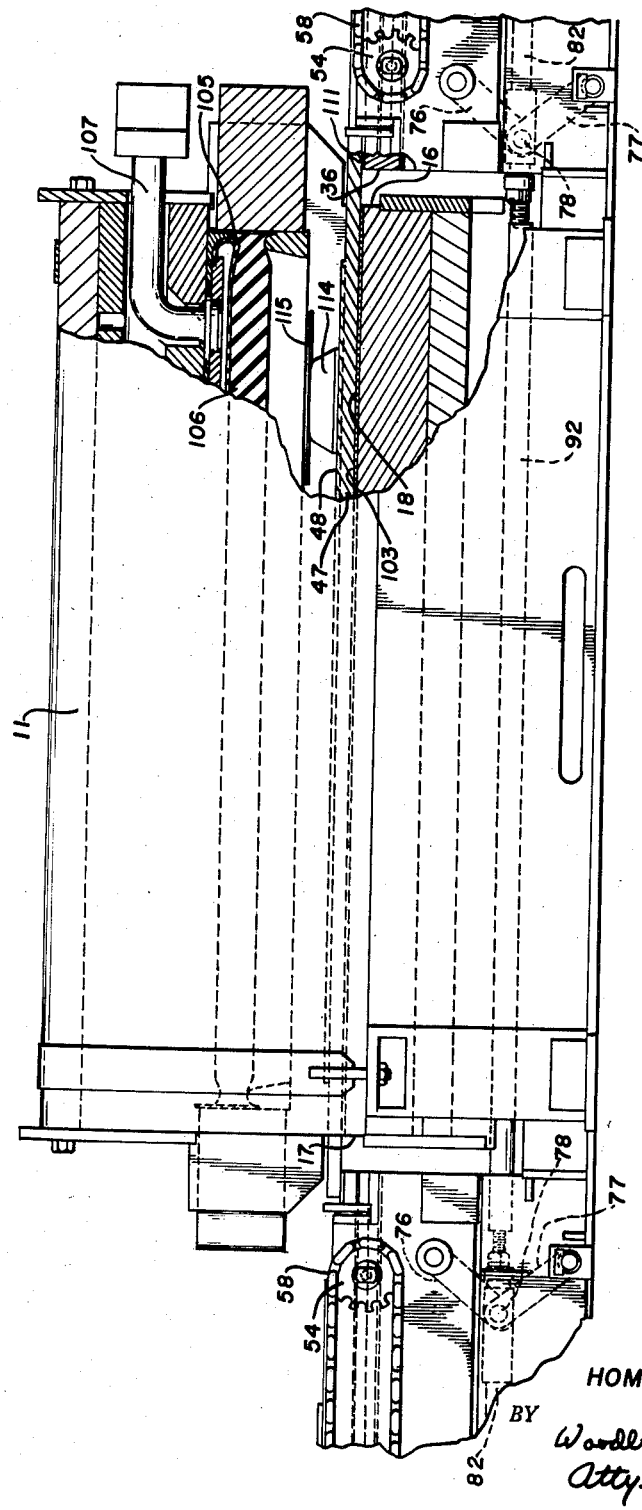
Figure 4 is a side elevational view partially in section of the press body of this invention and also shows partially the right and left wing of the press assembly.
Figure 8:
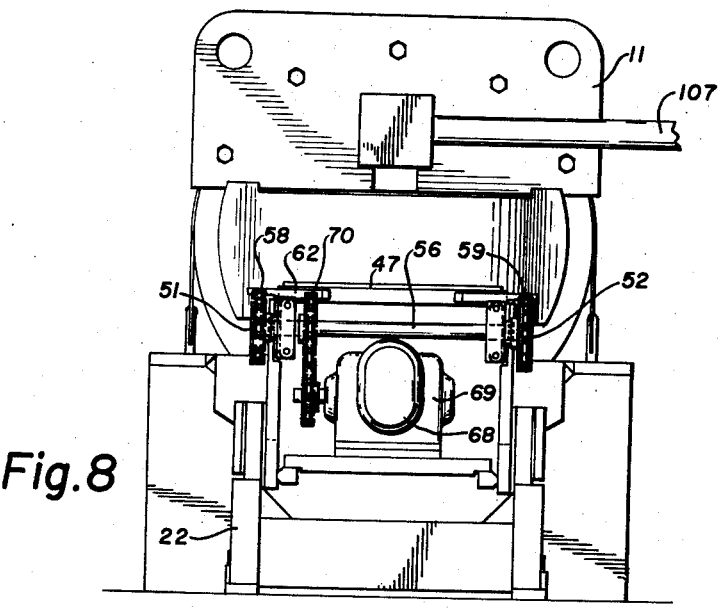
Figure 8 is an end view of the right wing which is shown in Figure 3.

With reference to the drawings the diaphragm press assembly is indicated by the reference numeral 10 and comprises generally a cylindrically shaped press body 11 and a right and a left wing 12 and 13 respectively. The cylindrically shaped press body 11 and the right and left wing 12 and 13 extend in a generally longitudinal direction. The cylindrically shaped press body 11 has a first and a second face 16 and 17, respectively, and has a bed surface 18 which extends generally horizontally and longitudinally therethrough from the first to the second face. The right wing 12 and the left wing 13 are substantially identical in construction and in operation so in the forthcoming description only the right wing will be described. As best seen in the Figurese 2, 3, 7, and 8 the right wing includes a base structure 22 extending therebeneath, a platform 23 and a linkage assembly 24. The linkage assembly 24 is connected at a lower end to the base structure 22 and to the platform 23 at an upper end thereof and is adapted to move the platform vertically between an upper and a lower position. The upper position of the platform 23 is best shown in Figure 3 of the drawings and the lower position is best shown in Figure 4 wherein the right and left wings are shown only partially. The platform 23 includes a pair of side plates 28 and 29 which are spaced apart and which lie generally in vertical planes. A plurality of channel irons 30 extend between the side plates 28 and 29 and are suitably attached thereto for giving support to the side plates of the platform 23.

Figure 7:
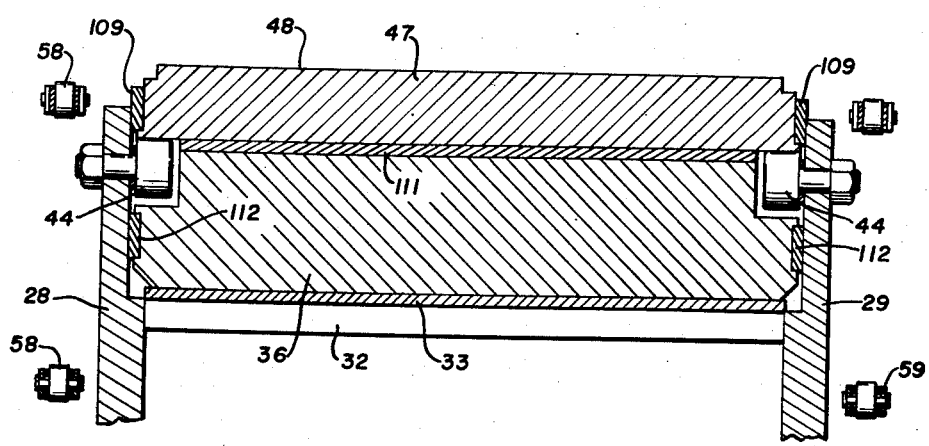
Figure 7 is a view taken generally along the lines 7—7 of Figure 3.

As best seen in Figure 7 a support member 32 is fixedly secured between the side plates 28 and 29 and lies generally in a horizontal plane. The support member 32 has a bearing plate 33 fixedly attached to the upper surface thereof. This bearing plate 33 may conveniently be made of brass or any other suitable material to provide a good bearing surface and minimize scoring or galling.

A filler block 36 slidably rests on the brass plate 33 of the support member 32. First hydraulic means or filler block moving means 38 is connected to a filler block 36 and is adapted upon actuation thereof to slide the filler block 36 relative to the support member 32, into and out of the press body 11. The first hydraulic means 38 comprise a hydraulic cylinder 39 and a hydraulic piston which is adapted to move within the hydraulic cylinder 39. A piston rod 40 extends from the hydraulic cylinder 39 and is suitably attached to the filler block 36 by bolts 41 or other suitable means.

A series of rollers 44 are journalled along the inside of the side plates 28 and 29 of the platform 23 at an upper portion thereof. These are best illustrated in Figures 3 and 7 of the drawings. A tableplate or worktable 47 is supported by the rollers 44 for longitudinal movement and resides directly above the filler block 36. The tableplate 47 is provided with a work surface 48. Table moving means are provided for moving the worktable 47 and includes first and second pairs of sprocket wheels and first and second continuous chains 58 and 59 respectively. The first pair of sprocket wheels includes sprocket wheels 51 and 52 rotatably mounted at one end of the right wing 12 and the second pair of sprocket wheels includes sprocket wheels 54 and 55 which are rotatably mounted at the press body end of the right wing 12. A shaft 56 interconnects sprocket wheels 51 and 52. The first and second continuous chain 58 and 59 are carried by and extend between the first and second pairs of sprocket wheels respectively. The first continuous chain 58 extends between the sprocket wheel 51 and the sprocket wheel 54 and the second continuous chain 59 extends between the sprocket wheel 52 and the sprocket wheel 55. A first and a second draw bar 62 and 63 are connected to the first and second continuous chains 58 and 59 respectively and are also connected to the end of the tableplate 47 by suitable means such as by the bolts 64. As will be noted at this point, movement of the continuous chains will cause a similar movement of the table plate 47. Drive means 67 are provided for rotating the shaft 56 which extends between the sprocket wheels 51 and 52. The drive means 67 includes a hydraulic motor 68 having a drive shaft which extends into a gear box 69. The output of the gear box 69 is operably connected to drive the shaft 56 by suitable means such as by the continuous chain 70 which extends between the output of the gear box 69 and the shaft 56.

The linkage assembly 24 includes first and second pairs of toggle joins 73 and 74 located at either end of the platform 23. Each of the toggle joints of each pair has an upper and a lower arm 76 and 77 respectively. The upper arm 76 of the toggle joints is pivotally connected to the platform 23 and the lower arm 77 of the toggle joints is pivotally connected to the base structure 22. A cross rod 78 connects together the toggle joints which make up each pair. First and second longitudinal connecting members 82 and 83 extend between and are connected to the cross rods 78. Second hydraulic means 86 are connected to the cross rod 78 of the first pair of toggle joints 73 for moving the toggle joints between a first and a second position and hence moving the platform 23 between an upper and a lower position. The first position of the toggle joints and the upper position of the platform are the positions which are indicated in Figure 3 of the drawings. The second position of the toggle joints and the lower position of the platform are shown by the positions of the platform and the toggle joints as seen in Figure 4 of the drawings. The second hydraulic means 86 comprises a hydraulic cylinder 88 suitably secured to the base structure 22 and having a piston, not shown, movable longitudinally therein. A piston rod 89 extends from the cylinder 88 and is operably connected to the cross rod 78 of the first pair of toggle joints 73 by a mechanical linkage member 90. Upon actuation of the second mechanical means 86 the toggle joints move from the first position shown in Figure 3 to the second position shown in Figure 4. Means are provided which include a rod 92 for connecting the linkage assembly of the right wing 12 to the linkage assembly of the left wing 13. This insures that upon movement of the right wing from the upper to the lower position that the left wing will also be transported from the upper position to the lower position. The linkage assembly 24 and the second hydraulic means 86 may also be referred to as lifting means.

First and second vertical guideway members 93 and 94 are located on either side of the platform 23. First and second guide means 96 and 97 extend from the side walls 28 and 29, respectively, to cooperate with the first and second guideway members 93 and 94 whereby the platform 23 is guided in a vertical direction upon movement of the platform between the upper and the lower position. Auxiliary guideway members 99 are located on either side of the platform 23 and at either end thereof and auxiliary guide means 100 are adapted to cooperate therewith. These auxiliary guideway members and auxiliary guide means assist the primary guide means for establishing vertical travel of the platform.

As best seen in Figure 4 the bed surface 18 of the press body 11 is provided with a brass bearing plate 103 to insure good sliding contact between the bed surface and the table plate 47 and the filler block 36 when they are alternatively received thereon. The press body also includes a diaphragm 105 and a deformable rubber pad 106. Fluid conduit means 107 communicates with the diaphragm 105 and provides a means for introducing pressure fluid therein. Upon receipt of high pressure fluid within the diaphragm 105 a deforming of the rubber pad 106 takes place which is seen in the fragmentary view shown in Figure 6.

As seen in Figure 7 the table plate 47 is provided with brass bearing plates 109 which are suitably fastened to the sides thereof to insure good sliding movement between the table plate and the side plates of the platform. The filler block 36 is provided with a brass bearing plate 111 on the top surface thereof and is provided with brass bearing plates 112 on either side thereof. These brass bearing plates that have been shown herein insure good sliding movement between all of the relatively movable parts of the diaphragm press assembly.

To describe the operation of the diaphragm press assembly the operation will be discussed starting with the table plate 47 outside of the press body 11 in the work loading position that is shown in Figure 3. When the tableplate 47 is in this position form blocks and work blanks may be placed on the work surface 48 thereof. In the accompanying drawings a single form block 114 and a single work blank 115 have been shown to aid in the description and operation of this machine. Actuation of the second hydraulic means 86 to a first condition causes the linkage assembly 24 to move the platform 23 to the lower position shown in Figure 4. In this lower position the tableplate 47 is on substantially the same horizontal level as the bed surface 18 of the cylindrically shaped press body. The next step in the operation of the press assembly is to actuate the driven means 67 to a first condition which causes the hydraulic motor 68 to drive the first and second continuous chains 58 and 59 which in turn are connected to the table plate 47 and which thereby causes the table plate to be slidably moved into the press body on the brass plate 103 which resides on the bed surface 18 of the press body 11. The tableplate 47 is of greater length than the bed surface 18 and as a result when the tableplate has reached the limit of its movement into the press body the opposite ends thereof will extend from either end of the press and will be located above the filler blocks of the right and left wing 12 and 13 respectively. After this operation has been completed the second hydraulic means 86 is actuated to a second condition which causes the platforms 23 of the right and left wings 12 and 13 respectively to be moved to the upper position which is illustrated in Figure 6 and as can be seen in Figure 6 this vertical movement causes the tableplate 47 to be lifted vertically within the press body 11 by the filler blocks of the right and left wings respectively. It will therefore be seen that the form blocks and work blanks which are carried by the work surface 48 of the table plate 47 approach the deformable rubber pad 106 in a generally vertical direction and also in a direction which is at approximately ninety degrees to the direction at which it enters the press body. The movement of the platforms to the upper position wherein the table plate is lifted vertically within the press body also establishes the filler blocks 36 on substantially the same level as the bed surface 18. The first hydraulic means in both the right and left wing 12 and 13 respectively are actuated in a first direction which causes the filler blocks in both wings to slidably move into the press body 11 on the press plates 103 which reside on the bed surface 18, and under the worktable 47. Each filler block extends approximately half way into the press body. The filler blocks in each position provide support for the tableplate 47 during the work forming operation. The movement of the filler blocks into the press body from opposite directions also serves to nullify any tendency which either of the filler blocks would have to push the tableplate out of the press body because of the slidable engagement therewith while entering the press body. Hydraulic fluid is next introduced into the chamber defined by the diaphragm 105 immediately above the deformable rubber pad 106. This high pressure fluid deforms the rubber pad 106 over the work blank 115 which resides upon the form block 114 and therefore makes the work blank conform to the outer surface of the form block. After the work forming operation has been completed the hydraulic pressure is taken off of the diaphragm and the reverse procedure from that described above is performed and the worktable is removed from the press body and returned to the work loading position shown in Figure 3. In this work loading position a workman removes the work blanks which have been shaped to the desired configuration and places new work blanks onto the form blocks in preparation for another work forming operation. It will readily be seen that if the form block should become tipped or if the facing of the rubber pad should become fractured during the work forming operation that little if any trouble would be encountered in attempting to remove the worktable from the press. This is mainly because the worktable approaches the rubber pad in a generally vertical direction. Another possible problem which this type of press obviates is the possible misplacement or jarring of work blanks from their position on respective form blocks because of engagement with the rubber pad. Since the form blocks and the work blanks approach the pad in this vertical direction and if the rubber pad and work blank should engage each other the tendency would be to hold the work blank in tighter engagement with the form block rather than misplacing it.

In the diaphragm press assembly which has been shown in this invention there is a table plate 47 on both the right wing 12 and the left wing 13. This means that while the tableplate of the right wing is within the press body during a forming operation a workman may be preparing form blocks and work blanks on the left wing 13. This speeds up production in a great measure thereby insuring a more efficient operation. It should also be borne in mind that more than two tables might be embodied within the principles disclosed in this invention to form what is commonly referred to as a serpentine conveyer type arrangement wherein a number of tables are arranged on a continuous conveyor system so that a great many more tables are available outside of the press body to perform any hand work which is necessary before the table goes into the press. This, of course, would be only an enlargement upon the principle herein disclosed.

Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a diaphragm press assembly including a press body and first and second platform assemblies, said press body having a first and a second end portion and having a bed surface extending longitudinally therethrough, said bed surface being of a first length, said first and second platform assemblies located at said first and second end portions of said press body respectively, each said platform assembly having a filler block and filler block moving means for moving said filler block longitudinally into and out of said press body, at least one of said platform assemblies having a worktable thereon, said worktable being of a second length which is greater than said first length, table moving means for moving said worktable into and out of said press body, lifting means for moving said platform assemblies between first and second vertical positions, said worktable located on substantially the same level as said bed surface when said platform assembly is in said first vertical position and said filler blocks located on substantially the same level as said bed surface when said platform assembly is in said second vertical position, actuation of said table moving means to a first condition when said platform assemblies are in said first vertical position causing said worktable to be moved into said press body on said bed surface with either end of said worktable extending from said press body and residing over said first and second platform assemblies respectively, movement of said platform assemblies to said second vertical position causing said worktable to be lifted therewith, and actuation of said hydraulic moving means to a first condition causing said filler blocks to enter said press body onto said bed surface to provide support for said worktable.

2. A diaphragm press assembly comprising a cylindrically shaped press body and a right and a left wing extending in a generally longitudinal direction, said press body having a first and a second face and having a bed surface extending horizontally and longitudinally therethrough from said first to said second face, each said wing including, a base structure extending therebeneath, a platform and a linkage assembly, said linkage assembly connected to said base structure and to said platform and adapted to move said platform vertically between an upper and a lower position, said platform including a pair of side plates spaced apart and lying generally in vertical planes a support member fixedly secured between said side plates and lying generally in a horizontal plane, a filler block slidably residing on said support member, first hydraulic means connected to and adapted to slide said filler block relative to said support member, a series of rollers journalled along the inside of said side plates at an upper portion thereof, a table plate supported by said rollers for longitudinal movement and residing above said filler block, first and second pairs of sprocket wheels rotatably mounted at either end of each said wing, first and second continuous chains carried by and extending between said first and said second pairs of sprocket wheels respectively, a first and second draw bar connected to said table plate, drive means for rotating said sprocket wheels, said linkage assembly including first and second pairs of toggle joints located at either end of said platform, each of said toggle joints having an upper and a lower arm, said upper arm of said toggle joints swivelably connected to said platform and said lower arm of said toggle joints swivelably connected to said base structure, a cross rod connecting together the toggle joints which make up each pair, first and second longitudinal connecting members extending between and connected to said cross rods, second hydraulic means connected to said cross rod of said first pair of toggle joints for moving said toggle joints between a first and a second position and hence moving said platform between said upper and said lower position respectively, means connecting the linkage assembly of said right wing to the linkage assembly of said left wing, a first and a second vertical guideway member located on either side of said platform, guide means cooperating with said first and second guideway members and attached to said platform whereby said platform is guided in a vertical direction, actuation of said second hydraulic means to a first condition causing said platform to be moved to said lower position whereat said table plate is on substantially the same horizontal level as said bed surface of said cylindrically shaped press body, actuation of said drive means to a first condition causing said table plate to be moved into said press body onto said bed surface, said table plate being of such length that the opposite ends of said table plate extend from said press and are located above the right and left wing respectively, actuation of said second hydraulic means to a second condition causing said platforms of said right and left wings to be moved to said upper position, said movement causing said table plate to be lifted vertically within said press body by said right and left wings respectively, said upper position of said platform establishing said filler blocks on substantially the same level as said bed surface, actuation in a first direction of said first hydraulic means in said platforms causing said filler blocks to move into said press body onto said bed surface from either end of said press thereby providing support for said table plate.

3. A diaphragm press assembly comprising a press body and a right and a left wing extending in a generally longitudinal direction, said press body having a first and a second face and having a bed surface extending generally horizontally and longitudinally therethrough from said first to said second face, each said wing including a fixed base, a platform and a linkage assembly, said linkage assembly swivelably connected between said base and said platform and adapted to move said platform between an upper and a lower position, said platform including a pair of spaced apart side plates, a support member fixedly secured between said side plates, a filler block slidably residing on said support member, first hydraulic means connected to and adapted to slide said filler block relative to said support member, a series of rollers journalled on said side plates, a table plate supported by said rollers for movement relative thereto, drive means for moving said table plate relative to said rollers, said linkage assembly including toggle joints located adjacent and connected to said platform mechanical means operably connecting said toggle joints together second hydraulic means connected to said linkage assembly for moving said linkage assembly between a first and a second position and hence moving said platform between said upper and said lower position respectively, means connecting the linkage assembly of said right wing to the linkage assembly of said left wing, guide means cooperating with said platform whereby said platform is guided in its movement between said upper and lower position actuation of said second hydraulic means to a first condition causing said platform to be moved to said lower position whereat said table plate is on substantially the same horizontal level as said bed surface of said press body, actuation of said drive means to a first condition causing said table plate to be moved into said press body on said bed surface with the opposite ends of said table plate extending from said press and located above the filler blocks of said right and said left wings respectively, actuation of said second hydraulic means to a second condition causing said platforms of said right and left wings to be moved to said upper position, said movement causing said table plate to be lifted within said press body by said filler blocks of said right and left wings jointly, said upper position of said platform establishing said filler blocks on substantially the same level as said bed surface, actuation in a first direction of said first hydraulic means in said platforms causing said filler blocks to move into said press body onto said bed surface from either end of said press thereby providing support for said table plate.

4. A diaphragm press assembly comprising a press body and a right and a left wing, said press body having a first and a second face and having a bed surface extending therethrough from said first to said second face, each said wing including a platform and a linkage assembly, said linkage assembly adapted to move said platform between an upper and a lower position, a filler block slidably residing within said platform, first hydraulic means adapted to slide said filler block relative to said platform, a table plate carried by said platform and residing above said filler block, a first and a second sprocket wheel rotatably mounted at either end of each said wing, a continuous chain carried by and extending between said first and said second sprocket wheel respectively, a draw bar connected to said continuous chain and also connected to said table plate, drive means for driving said sprocket wheels, said linkage assembly having second hydraulic means connected thereto for moving said linkage assembly between a first and a second position and hence moving said platform between said upper and said lower position respectively, means connecting the linkage assembly of said right wing to the linkage assembly of said left wing, guide means cooperating with said platform whereby said platform is guided in its movement between said upper and said lower position actuation of said second hydraulic means to a first condition causing said platform to be moved to said lower position whereat said table plate is in position to move into said press body, actuation of said drive means to a first condition causing said table plate to be moved into said press body, with the opposite ends of said table plate extending from said press body and located above said right and said left wing respectively, actuation of said second hydraulic means to a second condition causing said platforms of said right and left wings to be moved to said upper position, said movement causing said table plate to be lifted within said press body, said upper position of said platform establishing said filler block in a position to move into said press body actuation in a first direction of said first hydraulic means in said platform causing said filler block to move into said press body thereby providing support for said table plate.

5. A diaphragm press comprising a press body having a horizontal stationary bed surface and deformable resilient forming pad lying in a generally horizontal plane spaced vertically above said bed surface, a horizontally extending worktable comprising a plate adapted to carry workpieces, means for moving said worktable from a loading position outside said press to an intermediate position over said stationary bed and spaced a substantial distance below said forming pad to provide a clearance between said forming pad and workpieces on said worktable, means for engaging said worktable at the edge portions thereof and raising the same to a work position adjacent said forming pad and spaced above said bed in which position said work table receives forming pressure applied by the forming pad, said work table having such flexibility as to require support to maintain it horizontal under forming pressure, a filler block horizontally movable into and out of the space between said worktable and said bed and having a thickness substantially equal to the vertical distance between said worktable in its work position and said bed surface, said filler block having a shape adapted to provide bearing support between said worktable and said bed surface over substantially the entire area of said worktable subjected to downward force by said forming pad to prevent deformation of said worktable, and means for moving said filler block substantially horizontally into and out of the space between said worktable and said stationary bed when the worktable is in its work position.

6. A diaphragm press assembly comprising in combination a press body and first and second platform assemblies on opposite sides thereof, said press body supporting a deformable resilient forming pad in a generally horizontal position and a stationary horizontal bed surface spaced therebelow, a table for carrying workpieces and having edge portions extending beyond opposite sides of said bed surface and over said platform assemblies for raising thereby, said platform assemblies having a lower position in substantially horizontal alinement with said bed surface, means for moving said table when said platform assemblies are in the lower position in a substantially horizontal direction from a loading position outside said press body to an intermediate position in said press body with the edge portions of said table over said platform assemblies, means for lifting said platform assemblies for raising said table from said intermediate position to a horizontal work position adjacent said forming pad in which work position said table receives forming pressure applied by the forming pad, said table being relatively lightweight and of such flexibility as to require support to maintain it horizontal under forming pressure, filler block means having a thickness substantially equal to the vertical distance between said bed surface and said worktable when the latter is in its work position and being shaped to provide bearing engagement with said table and said bed surface so as to suport the table over substantially the entire area of said table subjected to pressure from said forming pad, and means for moving said filler block means substantially horizontally into and out of the space between said worktable and said bed surface when said platform assemblies are in the upper position.

7. A diaphragm press comprising a press body having a horizontal stationary bed surface and a deformable resilient forming pad lying in a generally horizontal plane spaced vertically above said bed surface, a horizontally extending table plate adapted to carry workpieces, means for moving said table in a horizontal path from a loading position at one side of said press to a position over said stationary bed and directly below said rubber pad, means for raising said table in a vertical direction to a work position adjacent said deformable pad and spaced above said bed, in which work position said table receives forming pressure from the forming pad, said table being of such flexibility as to require support to maintain it horizontal under such forming pressure, a filler block movable in a substantially horizontal path over said bed surface into and out of the space between said worktable and said bed surface, said filler block having a shape adapted to provide bearing support between said worktable and said bed surface over substantially the entire area of said worktable, and means for moving said filler block substantially horizontally into and out of the space between said worktable and said stationary bed when the worktable is in its work position.

References Cited in the file of this patent

UNITED STATES PATENTS

| | | |
|---|---|---|
| 1,547,871 | Grunberg | July 28, 1925 |
| 2,127,820 | Krindelberger | Aug. 23, 1938 |
| 2,317,869 | Walton | Apr. 27, 1943 |

FOREIGN PATENTS

| | | |
|---|---|---|
| 1,075,570 | France | Apr. 14, 1954 |